United States Patent

Hesse et al.

Patent Number: 5,196,688
Date of Patent: Mar. 23, 1993

[54] APPARATUS FOR RECOGNIZING AND FOLLOWING A TARGET

[75] Inventors: Klaus Hesse, Hamburg; Gerhard Schöne, Wedel/Holstein, both of Fed. Rep. of Germany

[73] Assignee: Telefunken Systemtechnik GmbH, Ulm, Fed. Rep. of Germany

[21] Appl. No.: 879,670

[22] Filed: Feb. 21, 1978

Related U.S. Application Data

[63] Continuation of Ser. No. 655,259, Feb. 4, 1976, abandoned.

[30] Foreign Application Priority Data

Feb. 4, 1975 [DE] Fed. Rep. of Germany ....... 2504536

[51] Int. Cl.⁵ ................... G01J 1/20; H04N 5/225; G06F 15/336
[52] U.S. Cl. ................... 250/203.6; 358/105; 358/125; 382/42
[58] Field of Search ......... 250/203 CT, 203.6; 358/105, 125; 356/152; 340/146.3 Q; 382/42

[56] References Cited

U.S. PATENT DOCUMENTS

| | | | |
|---|---|---|---|
| 3,794,761 | 2/1974 | Genchi et al. | 358/125 |
| 3,823,261 | 7/1974 | Bosley | 358/105 |
| 3,828,122 | 8/1974 | McPhee et al. | 250/203 CT |
| 3,846,752 | 11/1974 | Nakano et al. | 340/146.3 Q |
| 3,923,273 | 12/1975 | Alpers | 250/203 CT |
| 3,924,130 | 12/1975 | Cohen et al. | 358/105 |
| 3,943,277 | 3/1976 | Everly | 250/203 CT |
| 3,955,046 | 5/1976 | Ingham et al. | 358/105 |

Primary Examiner—Stephen C. Buczinski
Attorney, Agent, or Firm—Spencer, Frank & Schneider

[57] ABSTRACT

A system for recognizing and tracking a target with the use of an observation device which is directed toward the target and which follows the target with the aid of a setting drive connected in series with a computer. The observation device furnishes a signal representative of the structure of the target to the computer for computation of the genuine correlation between a stored target structure signal $B(\vec{x})$ which corresponds to the previously received image of the scene under observation, and the shifted target structure signal $B'(\vec{x}-\vec{\xi})$ which corresponds to the momentary image of the scene under observation, the genuine target deviation being expressed by the position of the maximum of the cross-correlation function $$\vec{K}(\vec{\xi}) = \int B(\vec{x}) B'(\vec{x}-\vec{\xi}) d\vec{x}$$

The computer continuously determines the deviation of the target in the x direction and in the y direction from the center of the scene image and emits setting signals, which correspond to the deviation, to the setting drive.

5 Claims, 3 Drawing Sheets

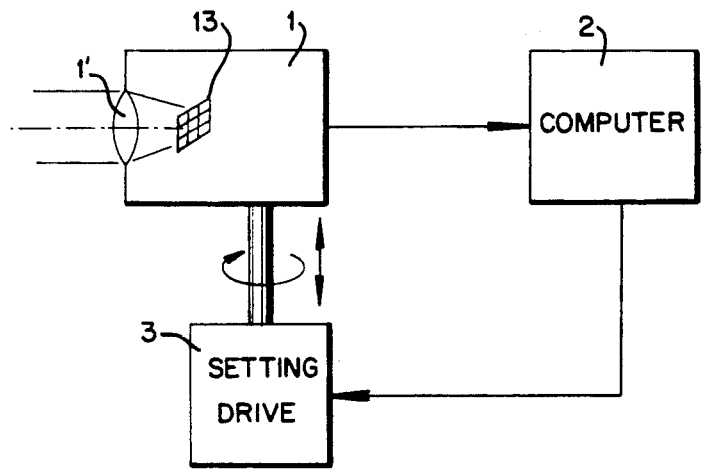
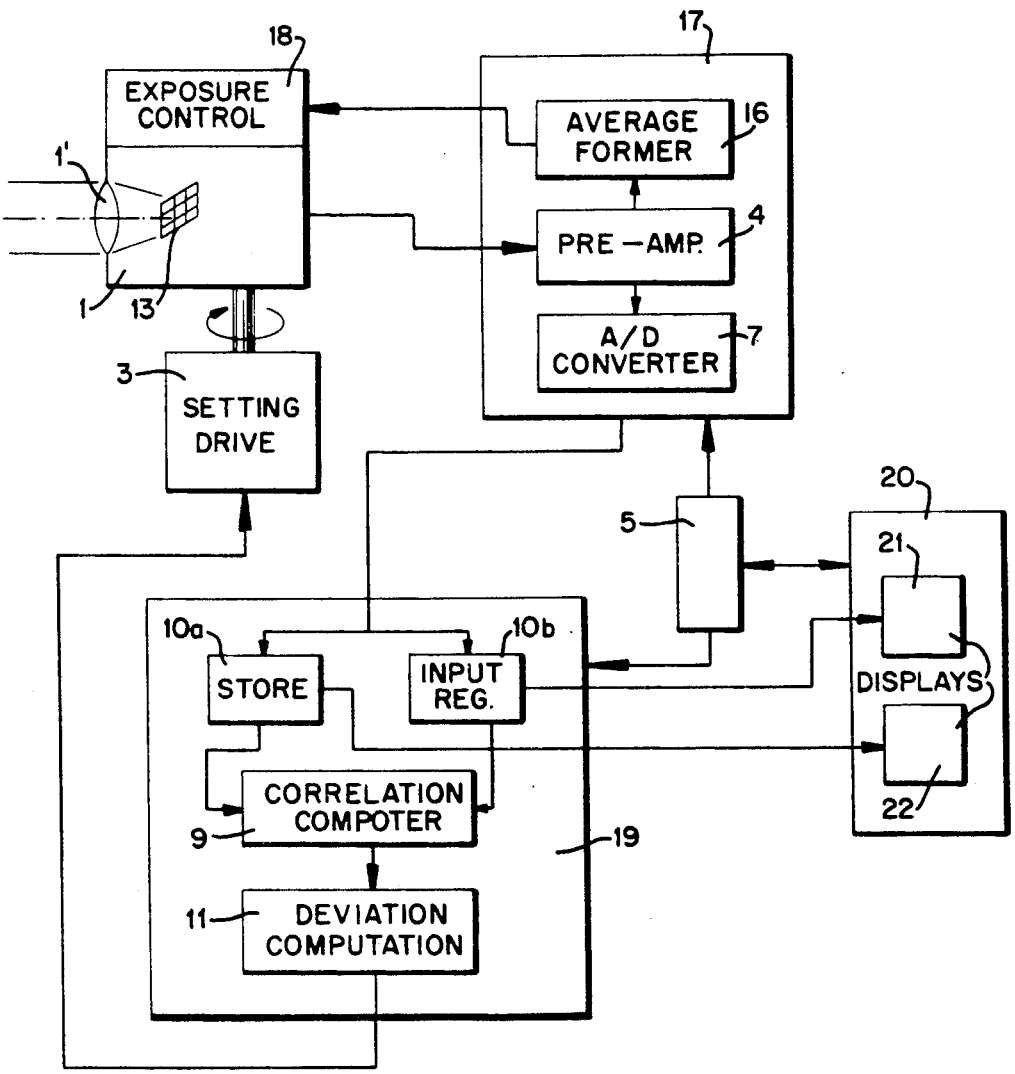

APPARATUS FOR RECOGNIZING AND FOLLOWING A TARGET

CROSS REFERENCE TO RELATED APPLICATION

This application is a continuation of application Ser. No. 655,259, filed Feb. 4th, 1976, now abandonded.

BACKGROUND OF THE INVENTION

The present invention relates to an apparatus for recognizing and following a target and utilizes an observation device directed toward the target which follows the target with the aid of a setting drive connected in series with a computer.

Target following systems, so-called tracking devices, are known which operate according to a contrast tracking principle. According to this principle, the scene observed by the observation device is divided into bright and dark areas, respectively, so that, for example, all bright areas are considered the target, all dark areas are considered as background (or vice versa) and the center of gravity of an area which has been recognized as the target is computed. Alternatively, the position of a bright/dark edge can be determined. When the target moves, a deviation signal is transmitted to a servo system which effects adjustment of the observation system or device to correspond to the deviation signal. Known embodiments of such target tracking systems are search heads with guadrant detectors or certain television tracking devices. All these devices have in common the utilization of the information "by contrasting the target against the background". This has the result, for example, that in this manner it is easy to follow a flying object since it generally appears dark with high contrast before a bright background. However, such a device fails if a target having average gray values is to be followed before a background with portions of different nature.

Target tracking devices are also known which evaluate the structure of the tracked target. A known device operates according to an optical process in which a space Fourier component of a target is examined as to its phase with respect to the shifted target position at a later time. The servo system regulates the observation device to a phase position which is constant in time. Since, however, the entire target structure cannot be stored, it is impossible, for example, to relocate a target once it has been lost.

SUMMARY OF THE INVENTION

It is the object of the present invention to provide an apparatus for recognizing and tracking a target which makes extensive use of the information obtained from the target while keeping the technical expenditures at a minimum, and utilizes the advantages afforded by digital computers.

This is accomplished according to the present invention in that the observation device furnishes the structure of the target to the computer to calculate the genuine correlation between a stored target structure signal, which corresponds to the previously received image of the scene under observation, and the shifted target structure, which corresponds to the presently received momentary image of the scene under observation. The target deviation being expressed by the position of the maximum of the cross correlation function $$K(\vec{\xi}) = \int B(\vec{x}) B'(\vec{x} - \vec{\xi}) d\vec{x}$$

and in that the computer continuously determines the deviation of the target from the center of the scene image in the x and y directions and gives signals to the setting drive which correspond to these deviations. The factors $B(\vec{x})$ and $B'(\vec{x} - \vec{\xi})$ indicate the stored and shifted target structures respectively.

According to the preferred embodiment of the invention, the computer is a digital computer and the target image signal is digitalized by means of an analog/digital converter before feeding same to the computer. According to a further feature of the preferred embodiment, a photodiode matrix is used as the sensor of the observation device. This permits the use of very small, robust cameras.

One advantage of the invention is that the utilization of the two-dimensional cross-correlation computation with high information content about the target increases the operational dependability of the system. With the use of microprocessors it is possible to manufacture the electronic processing device in an economical manner.

The following variations or additional features are possible within the context of the invention:

a) The average value (average brightness of the target) can easily be calculated from the summation of the light intensity of the individual photodiodes of the sensor and optimum exposure of the photodiode matrix can be obtained within the given limits by means of an automatic exposure system.

b) The memory in the computer containing the target can be continuously replenished and thus adapt itself to new circumstances, for example, if the target turns.

c) With the analog/digital converters having up to 100 gray stages the accuracy of the measurement of the deviation can be increased at will.

BRIEF DESCRIPTION OF THE DRAWINGS

FIG. 1 is a basic block diagram of the device for detecting and tracking a target.

FIG. 3 shows a modification of the embodiment shown in FIG. 2 in the form of a block circuit diagram.

DETAILED DESCRIPTION OF THE PREFERRED EMBODIMENTS

Figure 2:
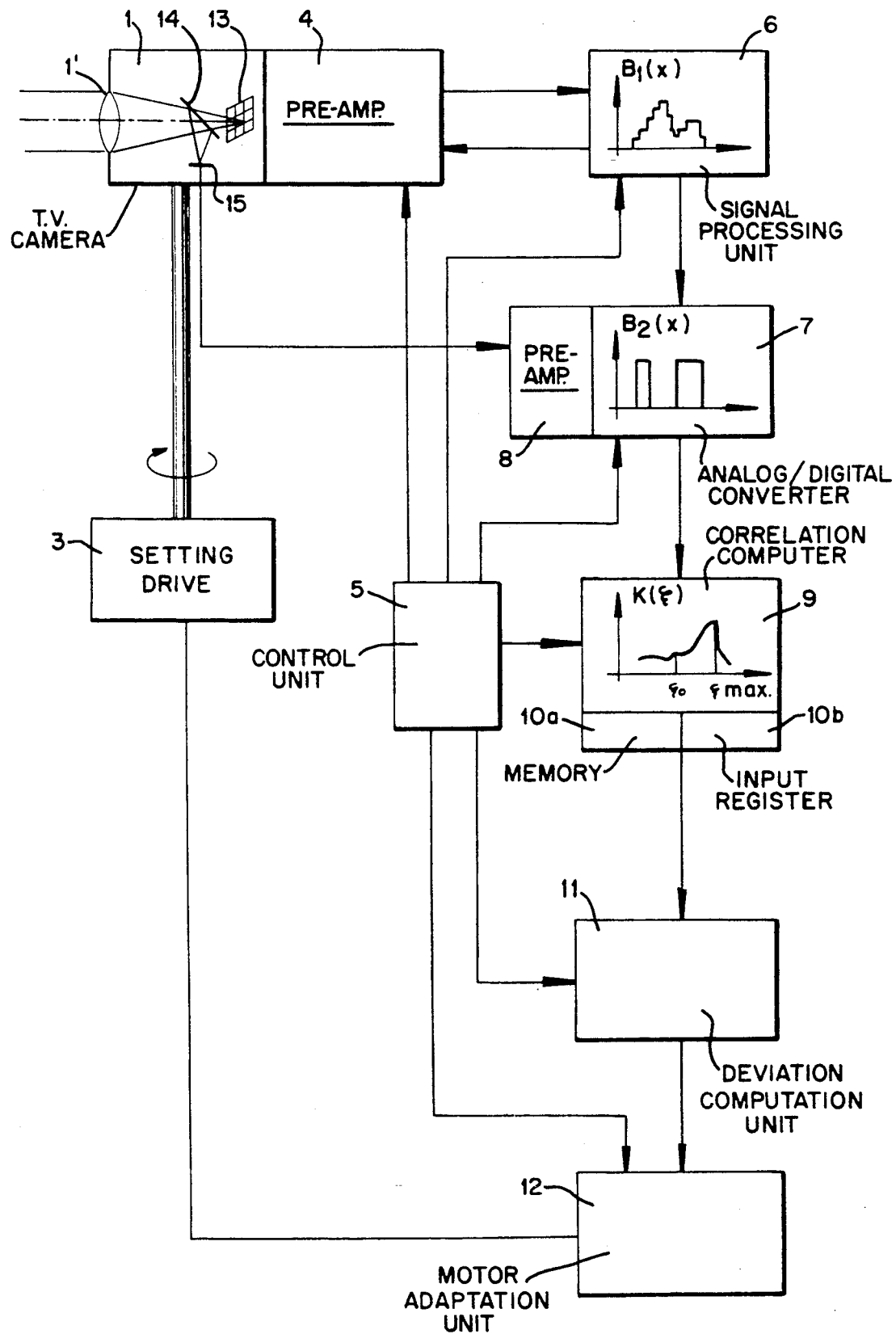
FIG. 2 is a block circuit diagram of one embodiment of an apparatus according to the invention (x direction only).

Referring now to FIG. 1 there is shown a TV-camera 1 which preferably includes a photodiode matrix 13 as the sensing element. The output signal from the camera 1, preferably after being fed to an analog/digital converter to digitalize the image of the target being tracked as photographed by the camera 1, is fed to a computer 2 which compares the signal representative of the target structure, which corresponds to the momentary image of the observed scene, with a stored target structure signal. The computer 2 then (1) determines the deviation of the target which is expressed by the maximum of the cross-correlation function $$K(\vec{\xi}) = \int B(\vec{x}) B'(\vec{x} - \vec{\xi}) d\vec{x}$$

where the factors $B(\vec{x})$ or $B'(\vec{x}-\vec{\xi})$ represent respectively the stored target structure and the shifted target structure which corresponds to the momentary image of the observed scene, (2) determines continuously the deviation of the target from the center of the scene image in the x and y directions and (3) emits setting signals corresponding to the deviation to a setting drive 3. In dependence on the setting signals received at its inputs the setting drive 3 produces an adjustment of the camera 1 about two axes to direct it toward the target.

FIG. 2 shows a system for recognizing and tracking a target where the components described in FIG. 1—and those of FIG. 3—are shown in more detail for the example of a unidimensional follow-up movement.

The camera 1 includes an objective lens 1', a photodiode matrix 13, a beam divider 14 and a photoelement 15 to measure the average brightness value. The diode matrix 13 is connected with a preamplifier 4 which is supplied by an operating system 5, which also supplies all other components not as yet identified, and furnishes the amplified structure B(x) of a target furnished by the camera 1 to a signal processing unit 6 which processes the analog signal B(x) to form a signal $B_1(x)$.

Figure 4:
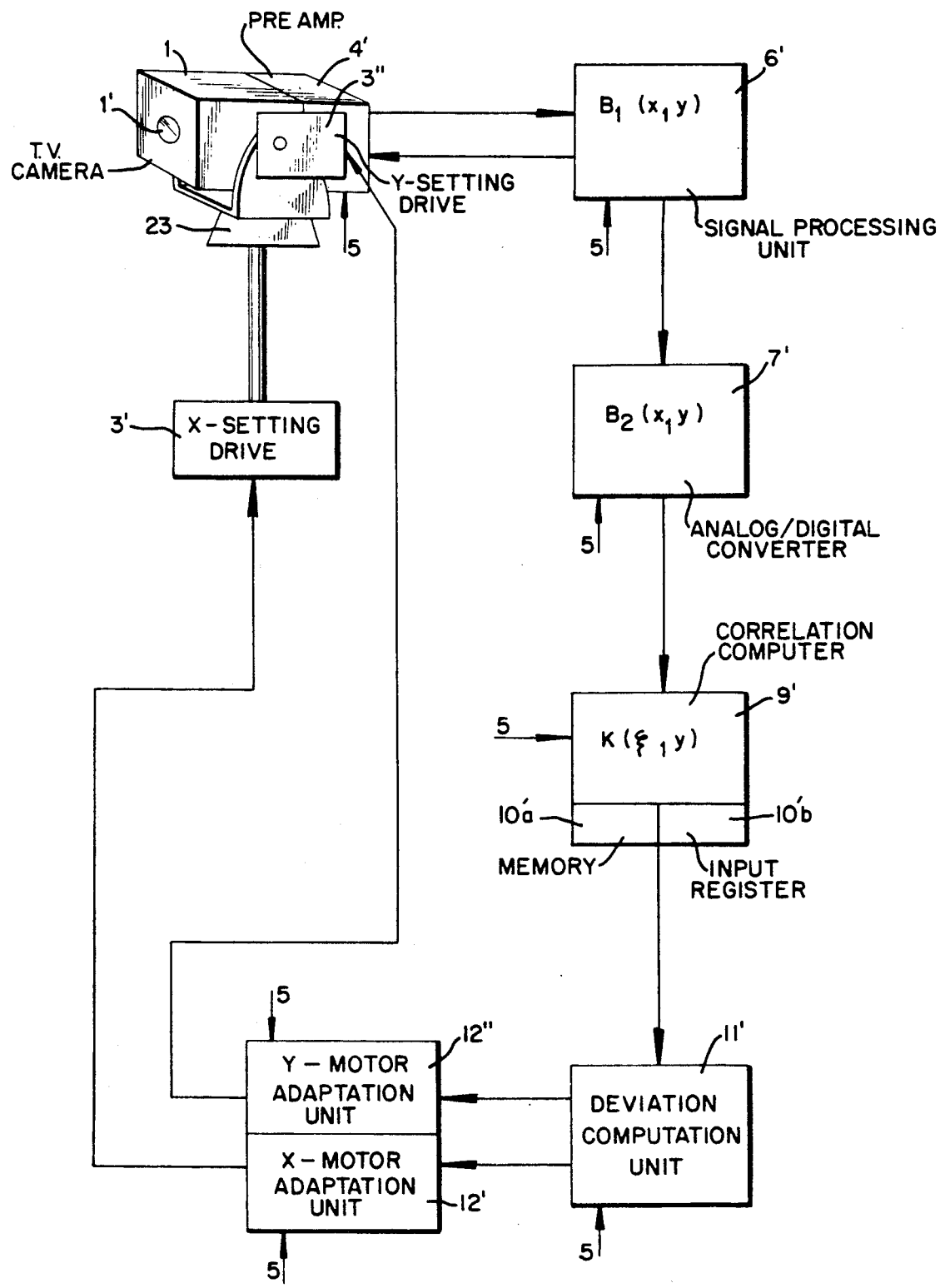
FIG. 4 is a block circuit diagram of a complete embodiment of an apparatus according to the invention (x y direction).

The processed signal $B_1(x)$ is fed to an analog/digital converter 7 which has as its reference the average brightness signal derived from the photoelement 15 via preamplifier 8. The analog/digital converter 7 converts the analog input signal $B_1(x)$ to a digital output signal $B_2(x)$ which is fed to the input of a correlation computer 9. The computer 9 includes a memory 10a in which the previously received target structure signal is stored and a register 10b which receives the shifted target structure signal corresponding to the momentary brightness distribution of the scene. The computer 9 computes the target deviation as expressed by the maximum of the cross-correlation function K $(\vec{\xi})$ between the target structure previously fed to the computer 9, i.e., the signal in memory 10a, and the shifted target structure as it corresponds to the momentary image of the scene under observation, i.e., the signal in register 10b. The output signal from correlation computer 9 is fed to a deviation computation unit 11 which is connected in series with the computer 9 to determine the deviation of the target in the x direction from the center of the scene and furnish setting signals corresponding to that deviation to a setting drive 3' via a motor adaptation and supply unit 12 so that the camera 1 can be adjusted in the x direction in dependence on the setting signals received by the setting drive 3'. FIG. 2 shows the system only for a deviation in the x direction, but the same also applies for a deviation in the y direction, a specially designed setting drive being used to adjust camera 1 in the y direction as well as in the x direction. In this case it is advisable for the setting signals for every direction to be furnished to the setting drive by the same computer, either in succession or in parallel. The system of FIG. 4 includes a x-setting drive and a y-setting drive, which drive the camera 1 in x and y direction by means of a frame 23. The setting signals for every direction are furnished in parallel by a deviation computation unit 11' via an x motor adaption and supply unit 12' and a y motor adaption and supply unit 12". The motor adaption and supply units 12' and 12" contain a digital/analog converter, a filter section, and a power amplifier. As the deviation computation unit 11' the well known Peak-Detector PD 855-3BCD of Hybrid Systems Corporation can be used. This Detector is published in the Data Conversion Handbook 1974, catalogue-No. 73/87651 and in a prospect of this firm.

The preamplifier 4' of the TV-camera 1 furnishes the amplified structure B (x, y) of a target furnished by the camera 1 to the signal processing unit 6' which processes the analog signal B (x, y) to form a signal $B_1$(x, y). Therefore a scanning operation can be used. As the signal processing unit 6' a well known sample and hold amplifier, for instance the S/H 730 of the Hybrid Systems Corporation can be used. The processed signal $B_1$(x, y) is fed to an analog/digital converter 7' which converts the analog input signal $B_1$(x y) to a digital output signal $B_2$(x y). This output signal is fed to the input of the correlation computer 9' which computes the target deviation as expressed by the maximum of the cross-correlation function K $(\vec{\xi}, \epsilon)$ between the target structure previously fed to the computer 9' and the shifted target structure as it corresponds to the momentary image of the scene under observation. The output signal from correlation computer 9' is fed to the deviation computation unit 11' to determine the deviation of the target in x- and y-direction from the center of the scene.

The analog/digital converter 7 may, for example, be a known analog-to-digital converter of the ADC-UH series of Datel Systems, Inc. described in Bulletin AUHDD10410, October, 1974, of that firm. The correlation computer 9 may, for example, be a model 3721A correlator of Hewlett Packard or one of the other such computers identified in the book by Wolfgang Wehrmann, Einführung in die stochastischergodische Impulstechnik (Introduction to the stochasticErgotic Pulse Technique), R. Oldenbourg Publishing House, Munich, Germany, 1973, FIGS. 4.34–4.37 and the accompanying text.

The device shown in FIG. 3 differs from that shown in FIG. 2 by a more appropriate design of the components involved. Thus the preamplifier 4 and the analog/digital converter 7, which are connected in series with camera 1, are combined into one unit together with an average forming circuit 16 which also receives the output signals from the preamplifier 4. The circuit 16 emits a signal to an exposure control 18 of the camera 1 to optimize the exposure. The output from the analog to digital converter 7 is fed to a computing component 19 to evaluate the signals.

The signal evaluation component 19, whose output is connected with the setting drive 3 to transmit the setting signals directly thereto, includes the correlation computer 9, memory 10a, memory register 10b which records the momentary scene, and the deviation computing unit 11. The system for recognizing and tracking a target further includes an operating and display device 20 which receives signals from components 10a and 10b of the signal evaluation component 19 so that the previously stored and the shifted target structure, the latter corresponding to the momentary image of the scene under observation, can be operated or made visible, respectively, with the aid of combined operating and viewing devices 21 and 22. Component 5 again constitutes the operating system.

It will be understood that the above description of the present invention is susceptible to various modifications, changes and adaptations, and the same are intended to be comprehended within the meaning and range of equivalents of the appended claims.

What is claimed is:

1. In a system for recognizing and tracking a target including observation means directed toward the target for producing an output signal representative of the momentary image of the scene including the target being observed, computer means, responsive to the output signals from the observation means, for producing output signals representative of the position of the target within the scene, and setting drive means, responsive to the output signals from said computer means, for causing said observation means to follow the target; the improvement wherein: said computer means is a digital computer; said output signal from said observation means is an analog signal; an analog to digital converter means is connected between the output of said observation means and the input of said computer means; said computer means includes correlation computing means for computing the genuine correlation between a target structure signal corresponding to a previously received output signal from said observation means which is stored in said computer and a signal, representing a shifted target structure, corresponding to the momentary image of the scene then being observed by said observation means, by determining the position of the maximum of the cross correlation function $$K(\vec{\xi}) = \int B(\vec{x}) B'(\vec{x} - \vec{\xi}) d\vec{x}$$

where the factor $B(\vec{x})$ represents the stored target structure signal and the factor $B'(\vec{x} - \vec{\xi})$ represents the shifted target structure signal, and means, responsive to the output signal from the correlation computing means, for continuously determining the deviation of the target in the x and y directions from the center of the scene image and for emitting setting signals to said setting drive means which correspond to said deviation.

2. A system as defined in claim 1 wherein said observation means includes a photodiode matrix as its light sensor.

3. A system as defined in claim 1 wherein said analog to digital converter means converts the respective values of said analog signal into multi-bit digital values.

4. In a system for recognizing and tracking a target including observation means directed toward the target for producing an output signal representative of the momentary image of the scene being observed, computer means, responsive to said output signals from said observation means, for producing output signals representative of the position of the target within the scene, and setting drive means responsive to the output signals from said computer means, for causing said observation means to follow the target; the improvement wherein: said computer means is a digital computer; said output signal from said observation means is an analog signal corresponding to the brightness distribution of the scene under observation; said system further includes an analog to digital converter means, connected between the output of said observation means and the input of said computer means, for converting the values of said analog signal into multi-bit digital values; and said computer means includes: storage means for storing a target structure signal corresponding to an image of the scene being observed by said observation means; correlation computing means for computing the genuine correlation between the target structure signal previously received and stored in said storage means and a shifted target structure signal corresponding to the momentary image of the scene then being observed by said observation means, by cross-correlating the entire said target and shifted target signals in two dimensions and determining the position of the maxima of the cross correlation function; and means, responsive to the output signals from said correlation computing means, for continuously determining the deviations of the target in the x and y directions from the center of the scene image and for emitting setting signals to said setting drive means which correspond to said deviations.

5. A system as defined in claim 4 wherein said correlation computing means utilizes the cross-correlation function $$K(\vec{\xi}) = \int B(\vec{x}) B'(\vec{x} - \vec{\xi}) d\vec{x}$$

where the factor $B(\vec{x})$ represents the stored target structure signal and the factor $B'(\vec{x} - \vec{\xi})$ represents the shifted target structure signal.

* * * * *